United States Patent [19]

Barbanti

[11] Patent Number: 5,445,134
[45] Date of Patent: Aug. 29, 1995

[54] SELF-COMPENSATED AND ELECTRICALLY HEATED REDUCER FOR COMPRESSED GAS OR L.P.G.

[75] Inventor: Arturo Barbanti, Casalecchio Di Reno, Italy

[73] Assignee: B B S.R.L., Forli, Italy

[21] Appl. No.: 182,121

[22] PCT Filed: Jul. 22, 1992

[86] PCT No.: PCT/IT92/00085
§ 371 Date: Jan. 31, 1994
§ 102(e) Date: Jan. 31, 1994

[87] PCT Pub. No.: WO93/03269
PCT Pub. Date: Feb. 18, 1993

[30] Foreign Application Priority Data

Jul. 30, 1991 [IT] Italy ............... BO91A0290

[51] Int. Cl.[6] ........................... F02M 21/04
[52] U.S. Cl. ..................... 123/527; 48/184; 48/189.2
[58] Field of Search ............ 123/525, 526, 527; 48/184, 189.2

[56] References Cited

U.S. PATENT DOCUMENTS

| | | |
|---|---|---|
| 1,450,236 | 4/1923 | Anderson et al. . |
| 2,831,758 | 4/1958 | Warner et al. ............... 123/527 |
| 3,565,201 | 2/1971 | Petsinger . |
| 4,596,211 | 6/1986 | Szloboda . |
| 4,765,303 | 8/1988 | Jones ............... 123/527 |
| 5,076,245 | 12/1991 | Jones ............... 123/527 |
| 5,101,799 | 4/1992 | Davis et al. ............... 48/184 |
| 5,117,798 | 6/1992 | Nozaki ............... 123/527 |
| 5,377,647 | 1/1995 | Jones ............... 123/527 |

FOREIGN PATENT DOCUMENTS 0182952  6/1986  European Pat. Off. .

Primary Examiner—Henry C. Yuen
Assistant Examiner—Erick Solis
Attorney, Agent, or Firm—Stevens, Davis, Miller & Mosher

[57] ABSTRACT

A self-compensating and electrically heated reducer for compressed gas or l.p.g. comprising, a supporting body, a chamber formed inside the body; a diaphragm; an opening inlet between an entrance and the chamber; a closing mechanism for the opening inlet controlling the flow rate of fuel owing to the action of manoeuvring elements, kinematically connected to the diaphragm, on the device controlling the pressure of the fuel coming from the bottle; a mechanism which acts on at least one of the manoeuvring elements to cancel the resultant of the action of the pressure of the fuel on the mechanism; electrical resistors connected with the feeding system in the engine placed in thermic contact with the walls of the body near the inlet.

13 Claims, 1 Drawing Sheet

SELF-COMPENSATED AND ELECTRICALLY HEATED REDUCER FOR COMPRESSED GAS OR L.P.G.

BACKGROUND OF THE INVENTION

The present invention refers to the reducers for combustible gases or l.p.g. used for feeding internal combustion engines and housed in bottles. These combustible gases are employed for feeding internal combustion engines for motor transport or for stationary equipment.

Since the pressure of the gas housed in the bottle decreases progressively with its consumption from a value of several hundreds of bars to zero, the uncontrolled forces to which the lever in the pressure regulator is subjected vary from some hundreds of Newtons (or N. x m.) to zero. In the first case, the uncontrolled forces are equal to the forces which the lever receives from the controlling diaphragm of the flow rate and the outlet pressure of the gas; in the second case they are zero. The precise degree of adjustment is negatively affected to a marked degree by the progressively decreasing variation of these forces.

As a result of the lack of precise adjustment and particularly when the pressure of the gaseous fuel is high, irregularities occur in the idling speed of the motor, consumption is higher than usual, and there is an uncontrollable emission of pollutants.

The irregularities in the slow running of the engine, the increased consumption and emission of polluting gases are aggravated by the differences in the amount of heat, which in standard water heat exchangers installed in the traditional pressure reducers is transmitted to the outflowing fuel emitted in a gaseous state by the reducer.

U.S. Pat. No. 1,450,236 refers to a pressure reducer according to the preamble of independent claim 1 herein; in a supporting body of said reducer a chamber is housed, the chamber presents an entrance and an outlet which are respectively connected with a source of a compressed fluid and a device of use.

A compensating mechanism is capable of cancelling the momentum which results from the action of the gas pressure on a manoeuvring device which is controlled by a main diaphragm of the reducer.

The manoeuvring device comprises a two-arm lever which pivots on a pivot fulcrum under the action both of a plunger, which acts the first arm and a spring which urges the second arm of the lever. In addition the lever is mechanically connected with the main diaphragm.

EP-A-0 182 952 discloses an electrically heated reducer for compressed gas or l.p.g. having electrical resistors connected with the feeding system of the engine placed in contact with the walls of the reducer body.

Said resistors are housed in a notch of an inner wall of the reducer and maintained adherent to the lower surface of said wall by means of springs placed between the upper surface of resistors and the lower surface of a metal plate fixed to the upper surface of said wall.

The purpose of this invention is to obviate these disadvantages.

The invention, as claimed, solves the problem by creating a pressure reduction unit which is self-compensating and electrically heated for compressed gases or l.p.g., by means of which the resulting thrust or the consequent momentum arising from the thrusts on the regulation lever, due to the pressure of the fuel contained in the bottle, are reduced to zero whatever the pressure, and the fuel which is emitted in a gaseous state from the reducer is heated to the same amount of heat per unit of mass of fuel supplied in every thermic state of the engine.

The advantages of the present invention lie in the possibility of controlling the pressure and maintaining constant the temperature of the fuel which is fed by the pressure reducer for every value of the pressure of the fuel contained in the bottle. This is achieved by means of the diaphragm and of the specially placed electrical resistors in the regulator. In this way, the regular idling speed of the engine, a measured consumption of fuel and a limited and controlled emission of pollutants may be obtained.

BRIEF DESCRIPTION OF THE INVENTION

In a preferred embodiment of the invention the self-compensating and electrically heated reducer for compressed gas or l.p.g. comprises: a supporting body; a chamber connected to an entrance and an outlet; a diaphragm which at each variation of the internal pressure of the chamber owing to the different amounts of gas fed controls a closing mechanism of an opening inlet to keep the pressure inside the chamber constant between the entrance, which connects with a bottle for compressed fuels or l.p.g., and the outlet, which connects with an internal combustion engine, in response to the vacuum caused by the engine; the opening inlet being situated at the end of a first channel placed in the body between the entrance and the chamber, and the closing mechanism for the opening inlet controlling the flow rate of fuel, owing to the action of manoeuvring elements kinematically connected to the diaphragm, on the closing mechanism controlling the pressure of the fuel coming from the bottle; a thrusting mechanism which acts on at least one of the manoeuvring elements to cancel the resultant or the momentum which results from the action of the pressure of the fuel on the manoeuvring elements wherein the diaphragm is connected with a first arm of the manoeuvring lever by means of a connection rod which engages with a second arm of the lever, and the closing mechanism is situated at the end of a first plunger which acts on the second arm by means of the thrusting action brought about by the pressure of the fuel in the first channel, a second channel, which receives the thrusting mechanism, being disposed between the entrance and the chamber; the lever having a third arm opposite the first arm with reference to the pivot on which it pivots; the thrusting mechanism urging on the third arm to negate the momentum of the first plunger's thrust with a thrust due to the pressure of the fuel in the second channel.

In a particularly preferred embodiment, electrical resistors connected with the feeding system in the engine are placed in thermic contact with the walls of the body.

Advantageously the electrical resistors are placed near the opening inlet.

Preferably the resistors present a resistivity which varies in inverse proportion to the temperature.

BRIEF DESCRIPTION OF THE FIGURE

Further advantages, details and salient features of the invention will be outlined in the following description of a preferred embodiment of the reducer as in the present invention, with reference to the accompanying single FIGURE of drawings which is a vertical section view of a reducer as in the present invention.

DETAILED DESCRIPTION

Figure 1:
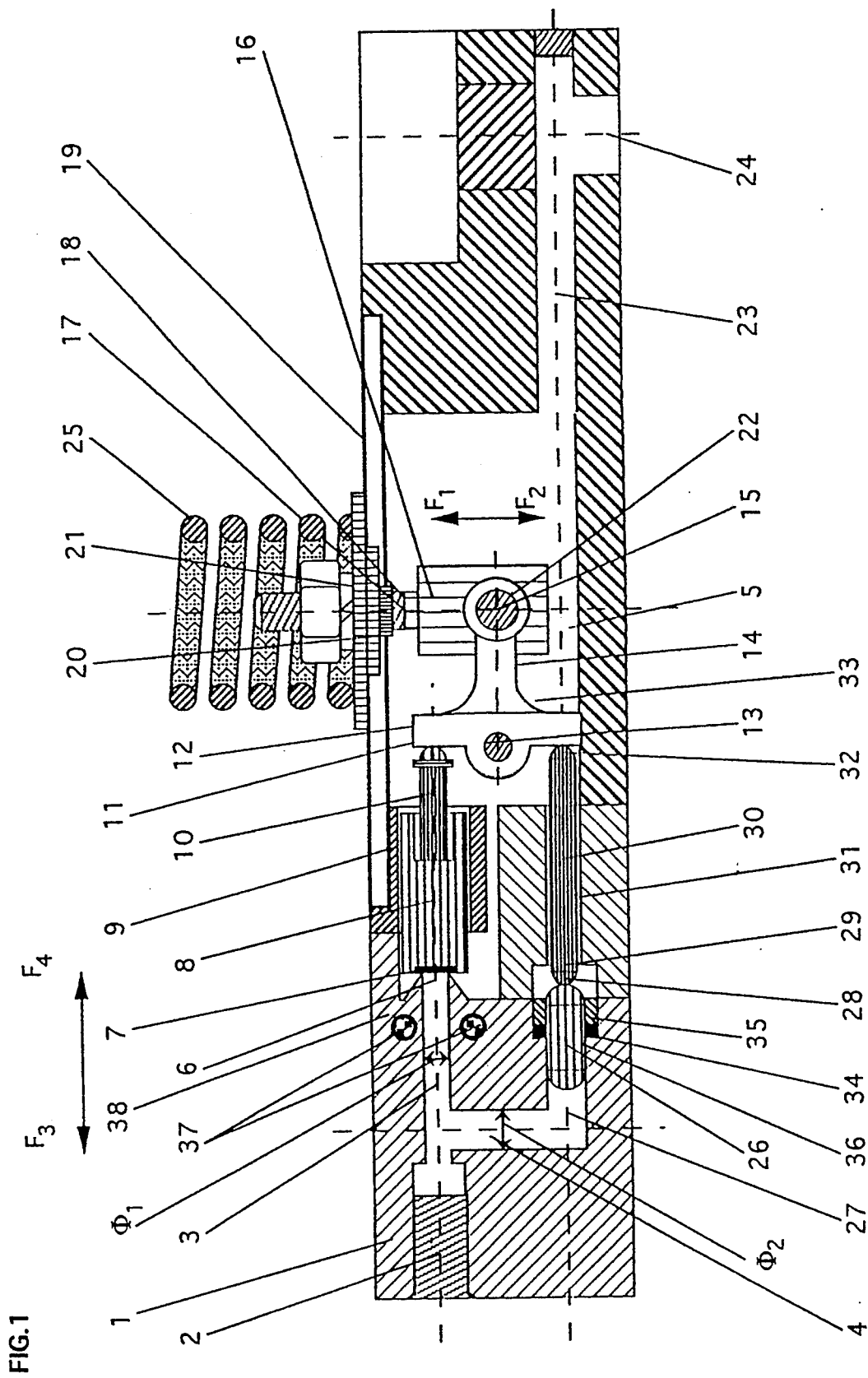

The reducer illustrated in the FIGURE forms a part of a feeding system of an internal combustion engine fed by compressed gases or l.p.g., comprising known structures and components, which are not illustrated.

DETAILED DESCRIPTION OF A PREFERRED EMBODIMENT

The reducer as illustrated consists of a supporting body 1 which has an entrance 2 connected with a bottle (not shown) and containing a compressed gas like methane, acetylene, hydrogen or l.p.g.

The entrance 2 is connected with a first rectilinear channel 3 having a first diameter $\Phi_1$ and a second channel 4 having a second diameter $\Phi_2$ which is greater than the first diameter $\Phi_1$ channels 3 and 4 being cut in the body 1. Channel 3 leads into a chamber 5 by means of an opening inlet 6 controlled by a closing mechanism 7; the closing mechanism 7 opens and closes the opening inlet 6 according to the axial movements of a first plunger 8, which moves within a guiding perforation 9 coaxial to the first channel 3. The plunger 8 is integral with a push rod 10 which rests on a first arm 11 of a manoeuvring lever 12 pivoting in a pivot 13, the pivot 13 being supported by body 1.

The function of the push rod 10 is to reduce the dimensions of the plunger 8 and to reduce its weight so as to reduce its inertia.

In use, the plunger 8 is free to move in direction $F_4$ owing to the thrust of the pressure of the fuel which is emitted from the opening inlet 6 when the lever turns in a clockwise direction; the plunger moves in the direction $F_3$ of the lever 12, which rotates in an anti-clockwise direction to close the opening inlet 6 by means of the closing mechanism 7, the lever 12 maintaining the closing position of plunger 8 in this position.

A second arm 14 of the lever 12 presents an end 15 which is kinematically connected to a connecting bushing 16 integral with an end 17 of a manoeuvring rod 18. The manoeuvring rod 18 is connected to a diaphragm 19 by means of two rigid plates 20 and 21; a spring 25 presses on plate 20.

In the embodiment illustrated in the FIGURE, the end 15 is introduced into a spherically jointed housing 22 situated in the bushing 16 to transmit the movements of the latter with lever 12; the coupling between the housing 22 and end 15 is a free coupling permitting the rotation of end 15 around the centre of the housing 22.

The manoeuvring rod 18 moves with the diaphragm 19 in the two directions indicated by the arrows $F_1$ and $F_2$ which, respectively, permit the diaphragm 19 to increase and reduce the volume of the chamber 5.

A channel 23 connects the chamber 5 to an outlet 24 which, in its turn, is connected to other components of the feeding system (not shown).

On the basis of this explanation and the accompanying illustration, and if we were to consider the second channel to be non-existent, the disadvantages of traditional reducers may readily be understood.

The actions which operate on lever 12 are due both to the movements of the diaphragm 19 and to the thrust resulting from the pressure of the fuel on the closing mechanism 7. The first actions are controlled by the characteristics of the membrane 19 and by the pre-loading of the adjustment of the spring 25; the actions are therefore capable of being controlled.

The actions due to the thrust of pressure of the fuel cannot be controlled, and their intensity varies from several newtons. to zero according as to whether the bottle is full or empty. It is obvious that a thrust of several N. would have an adverse effect on the precise adjustment by the diaphragm 19 of the flow rate. In fact, when the diaphragm moves in direction $F_1$, the closure of the opening inlet 6 by the closing mechanism 7 is prevented by the thrust of pressure of the fuel on the same element 7; when the diaphragm 19 moves in direction $F_2$, the opening of the opening inlet 6 by the closing mechanism 7 is facilitated by the same pressure. These actions caused by the pressure of the fuel are uncontrollable and vary from an intensity which approximates closely to the intensity of the action of the diaphragm 19. When the bottle is full, and during the opening of the opening inlet 6, these actions are added to the actions of diaphragm 19; when the bottle is empty, the same actions are zero.

To correct these disadvantages, a second plunger 26 is housed in the channel 4 which moves in a part 27 of the channel 4 in the directions $F_3$ and $F_4$. Since the part 27 is parallel with the channel 3, the directions $F_3$ and $F_4$ of the movements of the plunger 26 are parallel with the direction of the movements of the first plunger 8. In addition, an end 28 of the plunger 26 is in contact with the end 29 of a pusher 30 fitted with a sliding housing in a cylindrical cavity 31 coaxial to part 27 of channel 4. The movements of the pusher 30 occur in the directions $F_3$ and $F_4$; a second end 32 of the pusher 30 rests on a third arm 33 of the lever 12, arm 33 being opposite the first arm 11 in relation to pivot 13.

The pusher 30 placed between the plunger 26 and the arm 33 serves to articulate the thrusting means formed by the piston and the pusher 30.

Sealing means to prevent an unchecked flow of fuel towards the chamber 5 through the channel 4 and part 27, have been provided. These consist of an elastic ring 34 and a metallic ring 35, respectively, being housed in a cavity 36, in which the piston 26 moves, and in which part 27 of channel 4 terminates.

As may be seen from the FIGURE, it is evident that the lever 12 receives two thrusts owing to the pressure of the fuel in channels 3 and 4; the first thrust has the effect of rotating the lever 12 in a clockwise direction; the second thrust rotates lever 12 in an anti-clockwise direction, so as to cancel the movement due to the first thrust and to maintain the lever 12 under the control of the diaphragm 19.

Since the second piston 26 encounters friction owing to the presence of the blocking devices 34 and 35, an advantage in a preferred embodiment is that the diameter $\Phi_2$ of channels 4 and 27 should be greater than the diameter $\Phi_1$ of channel 3 in order to negate the momentum of the thrusts caused by the pressure of the fuel on lever 12.

As shown in the FIGURE, the walls 38 which enclose the area of body 1 next to the opening 6 present a cavity which houses the electrical resistors 37 connected with the electrically operated feeding system of the engine. These resistors are placed in thermic contact with the walls 38 to heat the fuel which, when flowing out from the opening inlet 6, expands and cools; they are electrically isolated from the body 1 by means of isolators (not shown).

The resistors 37 have the advantage of being type P.T.C., the resistivity of which varies according to the temperature to which they are subjected, the purpose being to give quantities of heat for units of time which decrease in duration as the temperature rises. In the heating phases, when the heat which is required to heat the fuel as it emerges in an expanded form from the inlet is greater, the resistivity of the resistors 37 diminishes, and the amount of heat given per unit of time by the resistors is greater; in the working phases of the engine at a stabilized temperature, when the amount of heat required to heat the fuel is generally less, the resistivity of the resistors 37 increases so that they can give smaller amounts of heat per each unit of time. Since, generally speaking, heat absorbed by the fuel which passes through the opening inlet 6 depends on the flow rate, the resistors maintain the temperature of the fuel constant, changing their electrical resistivity according to the temperature, so as to give greater amounts of heat per unit of time in direct proportion to the flow of the fuel. In this way the temperature of the fuel at the outlet of the reducer is virtually constant during any working condition and whatever the thermic state of the engine.

From the above information and illustration, it is apparent that a self-compensating reducer has been constructed for compressed gases or l.p.g., in which the adjustment of the mass flow of the fuel during the different working states of the engine does not depend on the pressure and temperature of the fuel in the bottle, nor on the thermic state of the engine. The idling speed of the engine, the consumption of fuel and the emission of polluting gases can therefore be accurately controlled, whatever the working state of the engine. The resistors 37 provide the walls of the body 1 in the proximity of the opening inlet 6 with amounts of heat which are sufficient for the instantaneous flow of the fuel, they keep the fuel at a constant temperature downstream from the opening inlet 6, and cooperate with the diaphragm to establish the correct mass flow of the fuel to the engine.

I claim:

1. A self-compensating and electrically heated reducer for compressed gas or l.p.g. comprising: a supporting body; a chamber fitted with an entrance connected to a bottle for compressed fuels or l.p.g., and an outlet connected to an internal combustion engine; a diaphragm which at each variation of the internal pressure of said chamber, owing to the different amounts of feeding gas, controls a closing mechanism for an opening inlet to keep said pressure inside said chamber constant between said entrance and said outlet in response to vacuum caused by said engine; said opening inlet being situated at the end of a first channel placed in said body between said entrance and said chamber, and said closing mechanism for said opening inlet controlling the flow rate of fuel, owing to the action of manoeuvring elements kinematically connected to said diaphragm, and said closing mechanism controlling said pressure of the fuel coming from said bottle; a thrusting mechanism which acts on at least one said manoeuvring elements to cancel the resultant or the momentum which results from the action of said pressure of the fuel on said manoeuvring elements, wherein said diaphragm is connected to a first arm of a manoeuvring lever by means of a connection rod which engages with a second arm of said manoeuvring lever, and said closing mechanism is situated at the end of a first plunger which acts on the second arm of said manoeuvring lever by means of said thrusting action brought about by said pressure of the fuel in said first channel, a second channel, which receives said thrusting mechanism, being disposed between said entrance and said chamber; said manoeuvring lever having a third arm opposite said first arm with reference to the pivot on which it pivots; said thrusting mechanism urging on the third arm to negate the momentum of the first plunger's thrust with a thrust due to said pressure of the fuel in said second channel.

2. A reducer as in claim 1, wherein electrical resistors, connected with a feeding system in said engine, are placed in thermic contact with the walls of said body.

3. A reducer as in claim 2, wherein said electrical resistors are placed near said opening inlet.

4. A reducer as in claim 3, wherein said resistors present a resistivity which varies in inverse proportion to temperature.

5. A reducer as in claim 4, wherein said resistors are of type P.T.C.

6. A reducer as in claim 1, wherein the diameter of said second channel is greater than the diameter of said first channel.

7. A reducer as in claim 1, wherein said first channel is rectilinear, said second channel having a rectilinear part parallel with said first channel.

8. A reducer as in claim 7, wherein said thrusting mechanism comprises a second plunger housed in said rectilinear part and a pusher fitted with a sliding housing in a cylindrical cavity; second plunger and pusher articulating said thrusting mechanism.

9. A reducer as in claim 1, wherein said manoeuvring lever presents an end which is kinematically connected to a connecting bushing integral with an end of said connection rod.

10. A reducer as in claim 9, wherein said end is introduced in a spherically jointed housing situated in said connecting bushing.

11. A reducer as in claim 10, wherein the coupling between said housing and said end is a free coupling permitting the rotation of said end around the centre of said housing.

12. A reducer as in claim 1, wherein said first plunger is integral with a push rod which rests on said first arm of said manoeuvring lever; said push rod reducing the dimensions of said first plunger to reduce its weight.

13. A reducer as in claim 1, wherein sealing means are provided, which cooperate with said thrusting mechanism to prevent an unchecked flow of fuel towards said chamber through said second channel.

* * * * *